May 7, 1968  J. R. TURK  3,382,383

SUBMERSIBLE PUMP MOTOR

Filed Sept. 13, 1965

INVENTOR.
JAMES R. TURK

BY
Oberlin, Maky & Donnelly

ATTORNEYS

United States Patent Office 3,382,383
Patented May 7, 1968

3,382,383
SUBMERSIBLE PUMP MOTOR
James R. Turk, Solon, Ohio, assignor to Vincent K.
Smith, Gates Mills, Ohio
Filed Sept. 13, 1965, Ser. No. 486,912
16 Claims. (Cl. 310—86)

The present invention relates generally, as indicated, to a submersible pump motor and, more particularly, to a submersible pump motor especially useful in driving a pump for domestic wells, the stator assembly of which is hermetically sealed in a new and novel manner, and a novel method of constructing the same.

It is quite important that the stator assembly of every submersible pump motor be absolutely water tight, or otherwise the water in which the motor is immersed will seep into the stator assembly and cause considerable damage to the stator laminations and windings, resulting in early burnout of the motor. Although many different methods for hermetically sealing stator assemblies are known, in general, such known methods have been found to be either too costly or not as effective as desired.

Accordingly, it is a principal object of this invention to provide a submersible pump motor with a stator assembly which is relatively inexpensive to manufacture and yet is completely sealed against moisture entering the same.

Another object is to provide such a submersible pump motor with novel rotor shaft support bearings and end covers for assisting in maintaining the bearings concentrically disposed within the bore of the stator assembly.

Still another object is to provide such a motor with a driven thrust washer mounted on the rotor shaft between the rotor and one of the rotor shaft bearings.

A further object is to provide a novel seal arrangement for retaining lubricating fluid within the motor casing and permitting volumetric expansion of the lubricating fluid caused by the heat generated by the motor.

Another object is to provide a novel method of assembling the various components of the submersible pump motor as described above.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
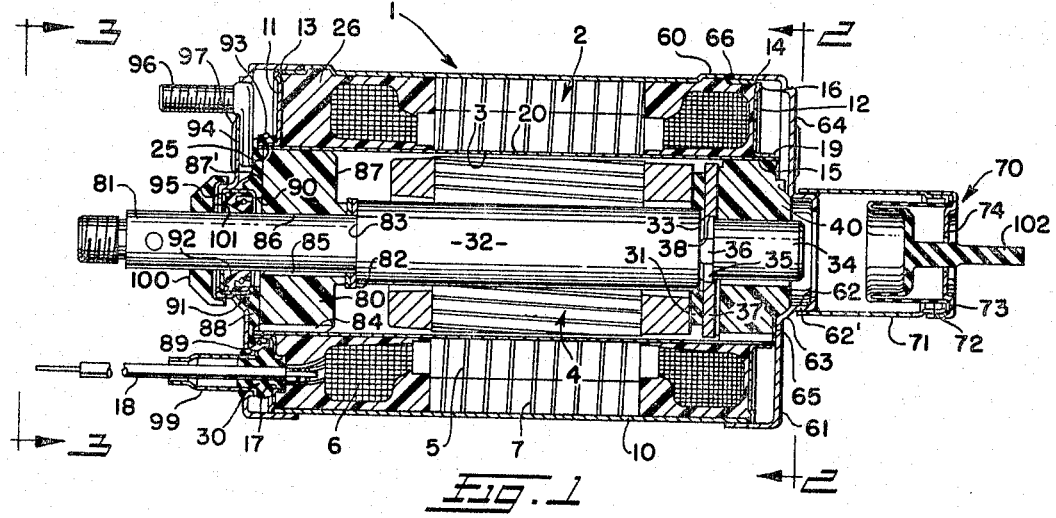
FIG. 1 is a substantially vertical longitudinal section of a submersible pump motor constructed in accordance with the present invention taken on the plane of the line 1—1 of FIG. 3.
Figure 3:
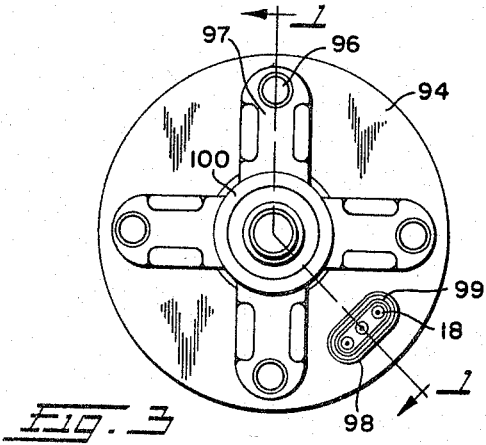
FIG. 3 is a left end elevation view of the motor of FIG. 1.

Turning now to the drawing, and first of all to FIG. 1, there is illustrated by way of example an induction motor 1 in accordance with the present invention comprising a stator assembly 2 in the bore 3 of which there is concentrically disposed a squirrel-cage or other type rotor assembly 4. The stator assembly 2 may be of any suitable construction, such as that disclosed in the Vincent K. Smith Patent No. 2,565,530, dated Aug. 28, 1951, wherein there is provided a stack of spider laminations 5 having exterior and axially extending slots into which stator windings 6 are wound and a stack of yoke laminations 7 is heat shrunk upon the stack of spider laminations 5.

The stator assembly 2 is hermetically sealed to prevent moisture from seeping into the assembly and causing damage thereto in the following manner. First the stator assembly 2 is pressed into a stainless steel or other such corrosion-resisting tubular shell 10. Next baffle end rings 11 and 12, also preferably of stainless steel, are positioned adjacent the ends of the shell 10 with the axial inner peripheral surfaces of the end rings contacting the adjacent ends of the shell, and a special expanding arbor (not shown) is inserted into the stator assembly bore 3 to hold the end rings concentrically with respect to such bore 3. While held in this position, the end rings 11 and 12 are fusion welded to the shell 10 around their entire peripheries as at 13 and 14, making sure that the welded joint is fluid tight. The rings 11 and 12 are of identical configuration, each having central openings 15 therethrough and peripheral flanges 16 which extend axially and radially outwardly, except that the end ring 11 is provided with an elongated opening 17 through which the stator leads 18 are adapted to extend for connection to an external power source. The walls of the central openings 15 are formed with axially outwardly extending flanges 19 which are of a diameter approximately equal to the diameter of the stator assembly bore 3.

After the end rings 11 and 12 have been welded to the shell 10 as aforesaid, the expanded arbor is removed and a stainless steel liner 20 is inserted into the stator bore 3. The length of the liner 20 is such that when it is properly centered within the stator bore 3, its ends are generally in alignment with the ends of the end ring flanges 19, whereby the flanges and liner may next be welded together all around as by fusion welding at 25 to make a leak proof joint.

Now the stator assembly 2 is ready to be filled with an epoxy casting resin 26 having excellent strength, chemical resistance, water resistance, and heat stability. Desirably, this is accomplished by injecting the epoxy 26 through the lead hole 17 in the end ring 11 while the entire stator assembly is in a vacuum chamber in order to fill all of the interstices in the windings 6 and spaces between the windings 6 and the slots of the stator laminations 5, 7. After the epoxy resin has been allowed to cure, a gasket 30, preferably made of neoprene, is slipped over the stator leads 18 and pressed into the opening 17 in the end ring 11, thereby ensuring against leakage into the stator assembly 2 around the leads 18.

The stator assembly 2 is thus hermetically sealed and ready for receipt of the rotor assembly 4 in the stator bore 3. Either before or after insertion of the rotor assembly 4 into the stator bore 3, a rubber leveling washer 31 is positioned on the rotor shaft 32 adjacent a shoulder 33 between the main portion of the rotor shaft 32 and the reduced end portion 34. The end portion 34 has a rib 35 formed thereon adjacent the shoulder 33, and there are a pair of oppositely disposed flats 36 on the rib 35 to establish driving engagement between the rotor shaft 32 and a metal thrust washer 37 disposed about the rib 35, such thrust washer having a similarly shaped bore 38.

Figure 6:
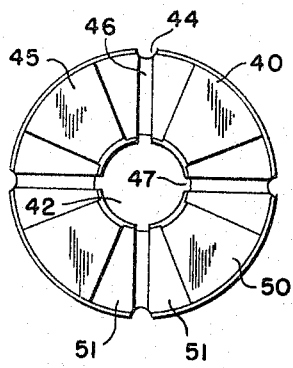
FIG. 6 is an end elevation view of the bearing of FIG. 4 as viewed from the left end thereof.

With the rotor assembly 4 properly in place, a right or rear rotor shaft support bearing 40 is slid over the right end portion 34 and brought into engagement with the thrust washer 37. As perhaps best seen in FIGS. 4–6, the rear support bearing 40 is generally in the shape of a cylindrical disc 41 with a central bore 42 therethrough. The outer periphery 43 of the disc 41 has a plurality of circumferentially spaced, longitudinally extending grooves 44, preferably four in number, while the axial inner end face 45 has a similar number of radially extending grooves 46, all of which cooperate to provide for free circulation of fluid in and around the bearing. In addition to the grooves 44 and 46, similar grooves 47 may be provided in the wall of the bore 42 for free circulation of lubricating fluid along the rotor shaft end portion 34.

The axial inner end face 45 of the bearing 40 is further provided with a plurality of equally spaced flat lands 50, desirably four in number, between which there are recessed portions 51 bisected by the radial grooves 46.

Figures 4, 5:
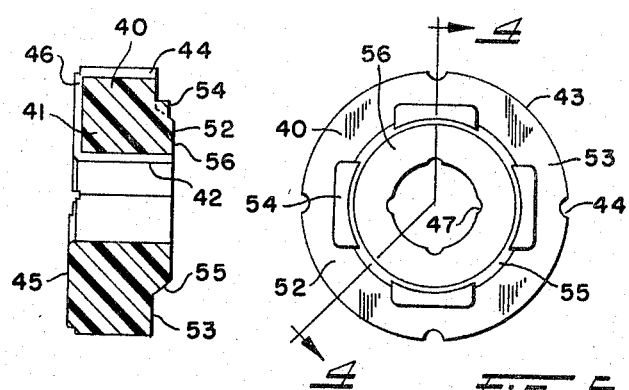
FIG. 4 is an enlarged vertical section of the rear or right end motor shaft support bearing of FIG. 1 taken on the plane of the line 4—4 of FIG. 5.
FIG. 5 is an end elevation view of the bearing of FIG. 4 as viewed from the right end thereof.

The axial outer end face 52 of the bearing 40, as clearly shown in FIGS. 4 and 5, is generally flat at 53 adjacent the radial outer edge thereof, and has four equally spaced, axially outwardly extending projections 54 along the inner circumference of the flat area 53. Between the projections 54 the outer end face 52 has spherical surfaces 55 which extend from about the radial middle of the projections 54 to the base of such projections. The remainder of the radial width of the outer end face 52 is flat at 56 in a plane substantially parallel to the peripheral flat area 53. The purpose of these projections 54 and spherical surfaces 55 on the radial outer end face 52 will become apparent in the discussion which follows.

Figure 2:
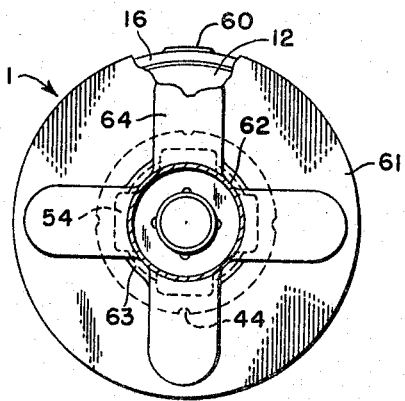
FIG. 2 is a vertical section of the submersible pump motor of FIG. 1 taken on the plane of the line 2—2, with the end cap partially broken away.

When positioning the rear support bearing 40 on the rotor shaft end portion 34, it is important that the projections 54 be radially aligned with the four equally spaced projections 60 formed in the shell 10 adjacent its ends, so that when the rear end cap or cover 61 is positioned in place, it may be properly oriented with respect to the spherical surfaces 55 on the bearing 40. Referring to FIGS. 1 and 2, the end cap 61 is cup-shaped and is provided with a central opening 62 the wall 62' of which extends axially outwardly and then radially inwardly for a short distance. Radially outwardly of the wall 62', there is a shallow spherical socket portion 63 having a configuration similar to that of the spherical surfaces 55 on the support bearing 40 for engagement therewith. In addition, there are four equally spaced, radially extending, axially outwardly projecting channel portions 64 in the end cap 61 which are of a width slightly greater than the width of the projections 54 on the support bearing 40. Accordingly, when the end cap 61 is moved into position as shown in FIGS. 1 and 2 with the channel portions 64 in radial alignment with the projections 60 on the shell 10, the spherical socket portion 63 on the end cap 61 will engage the adjacent spherical surfaces 55 on the bearing 40 and the bearing projections 54 will be received in the channel portions 64 to aid in maintaining the bearing concentrically disposed in the stator bore 3. A rubber washer 65 is disposed between the flat surface 53 on the bearing 40 and the adjacent surface of the end cap 61. While held in this position, the end cap 61 is spot or tack welded to the shell 10 at four places 66 adjacent the projections 60 to secure the same in place. Thus, the projections 60 on the shell 10 not only aid in orienting the mating surfaces of the end cap 61 and support bearing 40, but act as stops for limiting the extent to which the end cap is telescoped over the adjacent end of the shell 10.

The opening 62 in the end cap 61 is adapted to be closed by a diaphragm assembly 70 which both prevents the escape of lubricating fluid from the rear end of the motor 1 and accommodates volumetric expansion of the fluid which may result when heat is generated by the motor. As can be seen in FIG. 1, the diaphragm assembly 70 comprises a cylindrical housing 71 having one end welded to the wall 63 of the end cap 61, and having a flexible diaphragm 72 inserted in the other end. The peripheral edge 73 of diaphragm 72 is clamped to the housing 71 by a ring-shaped cover member 74 which is pressed over the outer end of the housing 71. The bead on the peripheral edge 73 forms a water tight seal between the outer end of the housing 71 and the adjacent surface of the cover 74.

The water in the well in which the motor 1 is to be used will act on the outer face of the diaphragm 72 and cause it to move inwardly until there is an equal pressure of lubricating fluid established within the motor, or until the diaphragm is moved in as far as its length will permit. Should the fluid expand within the motor due to the heat generated by the motor or for other reasons, the diaphragm will be forced outwardly by the fluid against the pressure of the water to provide the extra space needed.

Prior to securing the diaphragm 72 and cover 74 to the housing 71, it is desirable to complete the assembly of the other or forward end of the motor 1. This is done by first placing another support bearing 80 over the front end portion 81 of the rotor shaft 32, using shim washers 82 between the support bearing 80 and the adjacent shoulder 83 on the rotor shaft 32 when necessary for properly locating the support bearing 80 adjacent the front end of the liner 20. The support bearing 80, like the support bearing 40, is disc-shaped and is provided with a plurality of axially extending grooves 84 in the outer peirphery and similar grooves 85 in the wall of the central bore 86 for free circulation of lubricating fluid. The inner and outer faces 87 and 87' of the support bearing 80, however, are substantially flat.

Next, the front diaphragm 88 is positioned in place, it having an outer flange portion 89 for engagement with the outturned flange of the baffle end ring 11, a central opening 90, and an axially outwardly extending annular lip 91 which makes sealing contact with a shaft seal 92. The front diaphragm 88 is held in place by a high carbon spring steel wire 93 wrapped around the flange portion 89.

The shaft seal 92 and front end cap or cover 94 are then positioned on the shaft end portion 81 as a unit. The end cap 94 is provided with a central recess 95 into which the seal 92 is pressed after the mounting studs 96 have been welded in place in the cap channel portions 97, and has an elongated opening 98 in which there is mounted a lead support 99 through which the leads 18 are adapted to extend when the end cap is in the assembled position. The front end cap 94 is secured to the shell 10 of the motor 1 in the same manner as is the rear end cap 61; i.e., by tack welding the same thereto adjacent the shell projections 60. Finally, a slinger 100 is pusher over the end portion 81 of the rotor shaft 32 until the recess 101 therein overlies the adjacent portion of the end cap 94.

Now the motor 1 is ready for filling with lubricating fluid through the housing 71 while the motor is held in the vertical position. When the fluid reaches the desired level, the diaphragm 72 and cover 74 are positioned in place, but first making sure that any trapped air is permitted to escape at the beaded edge 73. This is accomplished by inserting the cover 74 only part way into position, and pushing against the fluid within the motor by forcing the diaphragm handle 102 inwardly. While many lubricating fluids are available which might be used, it has been found that a mixture of 50 percent propylene glycol, .05 percent $K_2HPO_4$, and 49.95 percent distilled water provides a very satisfactory non-freezing, non-toxic lubricating fluid.

From the above discussion, it should now be apparent that the submersible pump motor 1 of the present invention is both simple in construction and relatively easy to assemble, and provides a very effective means for sealing the stator assembly against moisture from entering the same. Also, the motor has a novel seal arrangement which not only ensures against the leakage of lubricating fluid from within the motor, but permits the expansion of such fluid as its temperature increases.

Other modes of applying the principles of the invention may be employed, change being made as regards the details described, provided the features stated in any of the following claims or the equivalent of such be employed.

I therefore, particularly point out and distinctly claim as my invention:

1. A submersible electric motor comprising a stator assembly, a tubular shell disposed around said stator assembly, a liner disposed within the bore of said stator assembly, end rings inserted between the ends of said shell and liner adjacent the ends of said stator assembly, said end rings being welded to said shell and liner while held concentric with respect to said stator bore, support bearings received within said liner, a rotor assembly disposed in said liner, said rotor assembly being concentrically supported in said stator bore by said support bearings, and end covers mounted on each end of said motor, one of said end covers being provided with a central axially outwardly extending spherical socket which engages spherical portions on the axial outer face of the adjacent support bearing to assist in maintaining said support bearing concentrically disposed in said stator bore.

2. The submersible electric motor of claim 1 wherein said adjacent support bearing is further provided with axially outwardly extending projections on the axial outer end face thereof, said spherical portions being located between said projections, and said one end cover is provided with a plurality of radially extending, axially outwardly projecting channel portions the depths of which are sufficient to clear said projections on said adjacent support bearing.

3. The submersible electric motor of claim 1 wherein said rotor assembly comprises a rotor and rotor shaft, said rotor shaft having reduced end portions which extend through central openings in said support bearings; and there is a shim washer on one of said shaft end portions adjacent the axial inner face of one of said support bearings for locating said rotor assembly with respect to said stator assembly, and a leveling washer and thrust washer on the other end portion of said rotor shaft.

4. The submersible electric motor of claim 3 wherein said thrust washer is keyed to said other end portion of said rotor shaft for rotation therewith.

5. The submersible electric motor of claim 3 wherein the axial inner end face of said support bearing which is adjacent said thrust washer is provided with a plurality of flat lands between which there are provided recessed portions intersected by radial grooves.

6. The submersible electric motor of claim 1 wherein one of said end covers is further provided with a central opening for receipt of the adjacent end portion of said rotor shaft, a plurality of openings for receipt of mounting studs, and an elongated opening in which there is mounted a lead support.

7. The submersible electric motor of claim 2 wherein said shell has a plurality of projections which have the same disposition as the projections on said adjacent support bearing and channel portions on said one end cover to assist in the proper orientation of said projections on said adjacent support bearing with respect to said channel portions.

8. The submersible electric motor of claim 7 wherein said projections on said shell are located adjacent the ends thereof to act as stops to limit the extent to which said end covers may be slid onto said shell.

9. The submersible electric motor of claim 1 further comprising seal means at each end of said liner for retaining a lubricating fluid within the motor.

10. The submersible electric motor of claim 9 wherein said lubricating fluid comprises a mixture of 50 percent propylene glycol, .05 percent $K_2HPO_4$, and 49.95 percent distilled water.

11. The submersible electric motor of claim 9 wherein one of said seal means comprises a cylindrical housing having one end attached to the adjacent end cover, a flexible diaphragm means inserted in the other end of said cylindrical housing for permitting volumetric expansion of the lubricating fluid, and means for releasably clamping the peripheral edge of said diaphragm means to said housing.

12. The submersible electric motor of claim 11 wherein said means for releasably clamping the peripheral edge of said diaphragm means to said housing comprises a ring-shaped member which is adapted to be pressed over the outer end of said housing to wedge said peripheral edge between said housing and ring-shaped member to form a water tight seal.

13. The submersible electric motor of claim 12 wherein said diaphragm means has a central handle means for forcing the same axially inwardly to bleed any trapped air from within said linear prior to forming such water tight seal.

14. The submersible electric motor of claim 9 wherein said other seal means comprises another diaphragm having an outer flange portion for engagement with an outturned flange on the adjacent end ring, and an axial lip which makes sealing contact with a shaft seal.

15. The submersible electric motor of claim 14 wherein there is a spring steel wire wrapped around said flange portion for holding the same in place.

16. The submersible electric motor of claim 14 wherein the end cover adjacent said another diaphragm has a central recess into which said shaft seal is pressed, said adjacent end cover also being provided with radially extending channel portions for receipt of the base portions of mounting studs.

References Cited

UNITED STATES PATENTS

| | | | |
|---|---|---|---|
| 2,654,848 | 10/1953 | Schaefer | 310—86 |
| 2,730,636 | 1/1956 | Dunn | 310—86 |
| 2,761,985 | 9/1956 | Schaefer | 310—86 |
| 2,800,597 | 7/1957 | Dunn | 310—86 |
| 2,829,288 | 4/1958 | Schaefer | 310—90 |
| 3,111,090 | 11/1963 | White | 310—90 |
| 3,116,432 | 12/1963 | Ekey | 310—87 |

MILTON O. HIRSHFIELD, *Primary Examiner.*

L. L. SMITH, *Assistant Examiner.*